June 8, 1965  C. W. TITTERUD  3,187,408
METAL WORKING TOOL
Filed Sept. 16, 1963
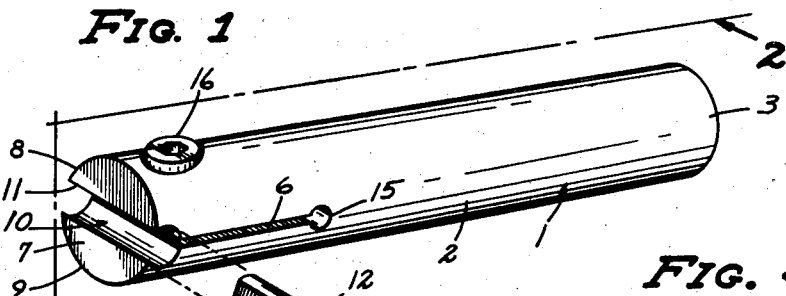
FIG. 1
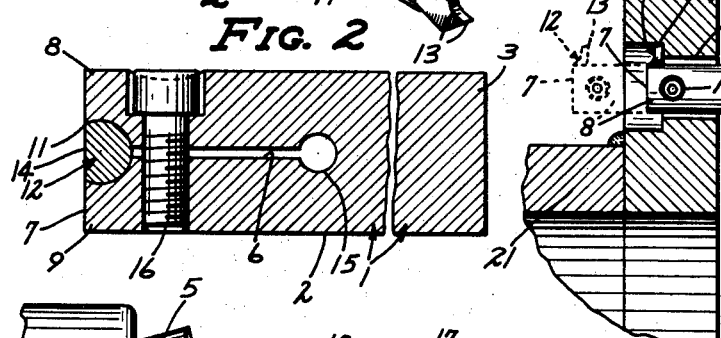
FIG. 2
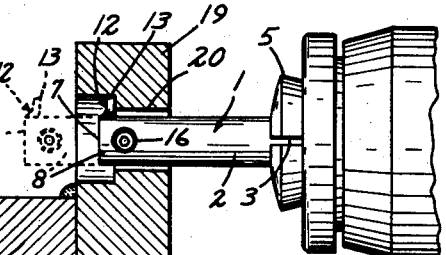
FIG. 4
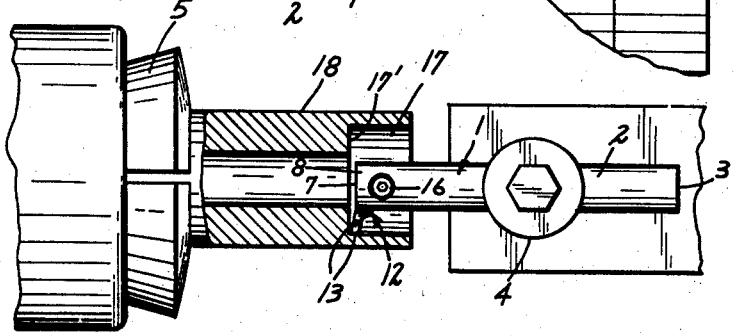
FIG. 3
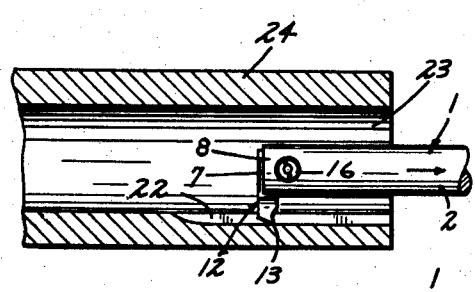
FIG. 5
FIG. 6
INVENTOR.
CURTISS W. TITTERUD
BY
Merchant, Merchant & Gould
ATTORNEYS

United States Patent Office 3,187,408
Patented June 8, 1965

3,187,408
METAL WORKING TOOL
Curtiss W. Titterud, Rte. 2, Anoka, Minn.
Filed Sept. 16, 1963, Ser. No. 309,149
3 Claims. (Cl. 29—96)

My invention relates generally to metal working tools and more particularly to tools for metal cutting.

The primary object of my invention is the provision of an extremely simple tool and cooperating bit which may be used to expeditiously and inexpensively perform operations heretofore considered difficult and performable only with much more complicated and expensive specialized tools.

A further object of my invention is the provision of a device of the class described which incorporates a minimum of working parts, is rugged and durable, and is highly efficient in its operation.

A further object of my invention is the provision of a device of the class immediately above described which is adaptable and utilizable with substantially all makes and varieties of metal working machines.

The above and still further objects of my invention will become apparent from the following detailed specification, appended claims and attached drawings.

Referring to the drawings, wherein like characters indicate like parts throughout the several views:

FIG. 1 is an exploded view in perspective of my novel tool and bit;

FIG. 2 is an axial section taken on the line 2—2 of FIG. 1, some parts being broken away;

FIG. 3 is a fragmentary elevational view showing my novel tool on the tool holder of a conventional lathe and as used in conjunction with a rotating workpiece, portions thereof broken away and shown in section;

FIG. 4 is a fragmentary view in plan corresponding generally to FIG. 3 but illustrating a specifically different operation;

FIG. 5 is a fragmentary view in axial section of a workpiece showing my novel tool as used in forming a keyway within a bore; and FIG. 6 is a fragmentary view corresponding generally to FIG. 5 but illustrating the use of my novel tool in the cutting of a keyway on the external surface of a workpiece.

Referring more specifically to the drawings and initially to FIGS. 1 to 4, inclusive, my novel tool comprises an elongated body 1 formed from conventional bar stock and having a cylindrical outer surface 2. The rear end portion 3 of the body 1 is securely gripped in the tool post 4 of a conventional lathe, not shown, but provided with a rotary head which is equipped with a workpiece carrying collet or chuck 5.

The front end portion of the body 1 is formed to provide an axially extended slot 6 which opens through a planar front surface 7 which is normal to the axis of the body 1. The slot 6 defines a pair of cooperating jaw elements 8, 9. At its forward end the slot 6 is enlarged to form a diametrically extended cross-sectionally arcuate bit-receiving mouth 10, in excess of 90° of which are defined by each of the cooperating jaw elements 8, 9. The restricted forward end of the mouth 10 which opens through the planar surface 7 is identified by the numeral 11.

Slidably adjustably receivable within the mouth 10 for movements radially of the axis of the body 1 and having a cross-sectional contour corresponding substantially thereto is a bit 12. It will be appreciated by those skilled in the art that a great variety of shapes may be ground on the cutting end of the bit 12 and, as such, only one illustration is thought necessary. To this end the bit 12 is ground to provide the cutting edges 13, whereas one side edge thereof is ground or cut away so as to provide a planar surface 14 which may, when desired, be caused to be coplanar with that of surface 7 for particular operations, as immediately hereinafter to be explained.

Interposed between the jaw elements 7, 8, intermediate the mouth 10 and the terminal point 15 of the slot 6 is a clamping screw or bolt 16 for securely gripping the bit 12 in its desired operative position.

In FIG. 3 the bit 12 is shown as being securely gripped in the mouth 10 with the planar surface 14 thereof coplanar with the front surface 7 of the body 1. It will be noted that with such an arrangement the cutting edges 13 not only project axially of the body 1 but radially thereof, thereby allowing facing of a counterbore 17 in a workpiece 18 mounted for rotation in the collet 5 of a rotary head, not shown. As there shown, the body 1 is securely positioned in a conventional tool holder 4 associated with a lathe or the like also not shown. It will be noted that because of the relief of the bit 12, as at 14, the front end 7 of the tool 1 is permitted to work in extremely close tolerance to the inner wall or face 17' of the counterbore 17, so as to permit facing off of said face 17'.

Referring now to FIG. 4 it will be noted that the tool 1 is itself mounted in the collet 5 of a rotary head of a conventional lathe or boring machine, not shown. The workpiece, on the other hand, is clamped or secured to a work table associated with such machine, to effect the counterboring of a flange 19 having an aperture 20. Because of the obstruction, as at 21, it is impossible to counterbore from left to right with respect to FIG. 4. Consequently, it becomes necessary to insert the tool through the opening 20 from right to left before inserting the bit 12 therein, as suggested by the dotted lines. As there shown, the bit 12 has been rotated in the mouth 10 so that the cutting edge 13 thereof not only faces rearwardly but also is rearwardly positioned with respect to the planar surface 7.

Referring now to FIGS. 5 and 6 wherein my novel tool 1 and cooperating bit 12 are shown in a manner illustrative of their use in conjunction with a conventional shaper or planer, not shown, FIG. 5 illustrates the cutting of a keyway 22 within the bore 23 of a tubular workpiece 24; whereas in FIG. 6 the position of the bit 12 is reversed so as to facilitate the cutting of a keyway 25 in the outer surface 26 of a workpiece 27.

From the above it should be obvious that my novel tool 1 and cooperating bit 12 is very versatile in its use, and while I have shown a preferred embodiment thereof, it should be understood that same may be capable of modification without departure from the scope and spirit of the appended claims.

What is claimed is:
1. In a device of the class described,
   (a) an elongated tool body having a cylindrical cross-sectional contour adjacent its rear end for gripping reception by the mounting head of a metal working machine,
   (b) and having a planar front surface normal to the axis thereof,
   (c) the front end portion of said tool body being formed to provide an axially extended slot which opens through said front surface and defines a pair of cooperating jaw elements,
   (d) said slot at its forward end being enlarged to form a diametrically extended cross-sectionally arcuate mouth of more than 180° of circular arc,
   (e) a bit slidably adjustably receivable in said mouth and having a cross-sectional contour conforming generally to that of said mouth,
   (f) and means for imparting gripping pressure to said jaw elements.

2. The structure defined in claim 1 in which the work-engaging end of said bit projects axially forwardly and radially outwardly of said tool body.

3. In a device of the class described,
(a) an elongated tool body having a cylindrical cross-sectional contour adjacent its rear end for gripping reception by the mounting head of a metal working machine,
(b) and having a planar front surface normal to the axis thereof,
(c) the front end portion of said tool body being formed to provide an axially extended slot which opens through said front surface and defines a pair of cooperating jaw elements,
(d) said slot at its forward end being enlarged to form a diametrically extended cross-sectionally arcuate mouth of more than 180° of circular arc,
(e) a bit slidably adjustably positioned within said mouth approximately perpendicular to the axis of said tool body and having a work engaging end thereon extending radially outwardly of said tool body,
(f) and means for imparting gripping pressure to said jaw elements.

References Cited by the Examiner
UNITED STATES PATENTS

| | | | |
|---|---|---|---|
| 763,070 | 6/04 | McNeil | 29—96 |
| 1,415,379 | 5/22 | Martin | 29—96 |
| 2,550,949 | 5/51 | Weidner | 29—96 |
| 2,556,723 | 6/51 | Hoffart | 29—96 |
| 2,848,788 | 8/58 | Goglanian | 29—96 |

WILLIAM W. DYER, JR., *Primary Examiner.*